Aug. 21, 1951 P. M. G. TOULON 2,565,102

SYSTEM FOR CONNECTING A SINGLE CHANNEL WITH A PLURALITY OF CHANNELS IN PERIODICAL SUCCESSION

Filed April 2, 1947 6 Sheets-Sheet 1

Inventor
PIERRE MARIE GABRIEL TOULON
by Toulmin & Toulmin
Attorneys

Inventor
PIERRE MARIE GABRIEL TOULON
by Toulmin & Toulmin
Attorneys

Aug. 21, 1951 P. M. G. TOULON 2,565,102

SYSTEM FOR CONNECTING A SINGLE CHANNEL WITH A PLURALITY OF CHANNELS IN PERIODICAL SUCCESSION

Filed April 2, 1947 6 Sheets-Sheet 3

Inventor
PIERRE MARIE GABRIEL TOULON.
by
Toulmin & Toulmin
Attorneys

Aug. 21, 1951 P. M. G. TOULON 2,565,102

SYSTEM FOR CONNECTING A SINGLE CHANNEL WITH A PLURALITY OF CHANNELS IN PERIODICAL SUCCESSION

Filed April 2, 1947 6 Sheets-Sheet 4

Inventor
PIERRE MARIE GABRIEL TOULON
by Toulmin & Toulmin
Attorneys

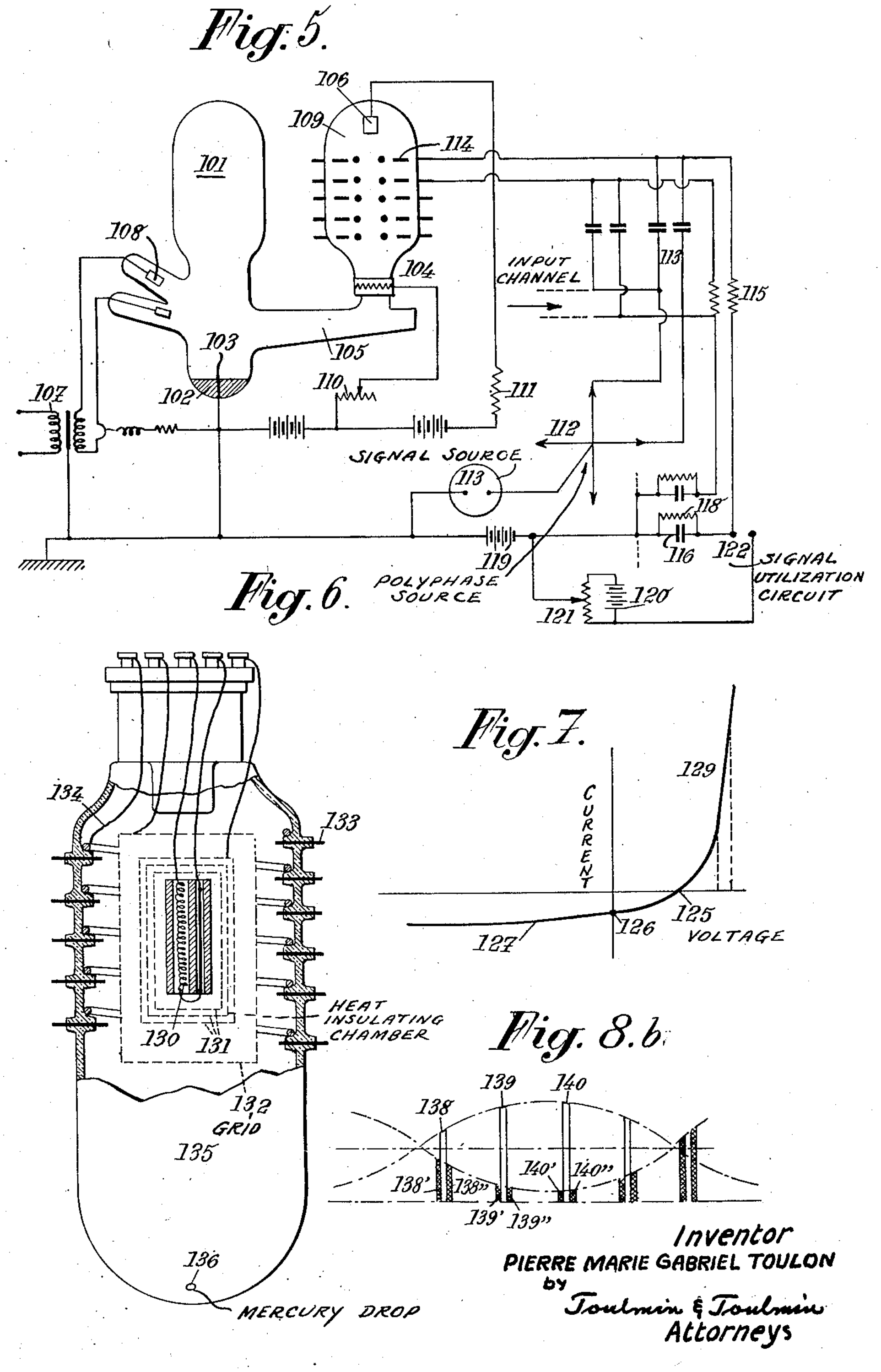
Fig. 5. Fig. 6. Fig. 7. Fig. 8.b.
Inventor
PIERRE MARIE GABRIEL TOULON
by
Toulmin & Toulmin
Attorneys Aug. 21, 1951 P. M. G. TOULON 2,565,102

SYSTEM FOR CONNECTING A SINGLE CHANNEL WITH A PLURALITY OF CHANNELS IN PERIODICAL SUCCESSION

Filed April 2, 1947 6 Sheets-Sheet 6

Inventor
PIERRE MARIE GABRIEL TOULON
by Toulmin & Toulmin
Attorneys

Patented Aug. 21, 1951 2,565,102

UNITED STATES PATENT OFFICE 2,565,102

SYSTEM FOR CONNECTING A SINGLE CHANNEL WITH A PLURALITY OF CHANNELS IN PERIODICAL SUCCESSION

Pierre Marie Gabriel Toulon, Neuilly-sur-Seine, France, assignor to Products & Licensing Corporation, New York, N. Y., a corporation of Delaware Application April 2, 1947, Serial No. 739,019
In France March 15, 1941

Section 1, Public Law 690, August 8, 1946
Patent expires March 15, 1961

23 Claims. (Cl. 250—27)

The present invention relates to devices for the distribution, among several independent output channels, of successive electrical impulses supplied through a common input channel, this device being based upon the use of capacitors formed by systems of conductor strips as described in my U. S. Patent No. 2,471,253, for Signal Distributing Systems, dated May 24, 1949.

The object of my invention is to provide a distributor device of this kind which is better adapted to meet the requirements of practice than those made for the same purpose up to the present time.

In devices of the kind above referred to, each output channel is coupled with a conductor strip connected with an anode, and the cathode that cooperates with said anode is connected with the input channel. Passage of the signals through the respective output channels is obtained by successively inducing in said conductor strips a given potential relation with respect to said cathode. This given potential relation corresponds in fact to the passage through a sharp maximum above a given level, of a varying voltage imparted to each of said conductor strips. These varying voltages must be imparted to the respective conductor strips so as to cause them to pass successively through said maximum and this result is obtained by superposing in said strips several alternating currents of different respective frequencies. For this purpose, the strips in question are disposed on one face of a sheet or layer of insulating material, so as to run all at least substantially in the same direction, and the other face is provided with a plurality of conductor strips extending transversely to this direction, the whole constituting a kind of multiple capacitor. Polyphase currents of different frequencies are supplied to the last mentioned strips, which can therefore be considered as "primary" strips, inducing, by capacity effect, the desired voltages in the "secondary" strips coupled with the respective anodes and output channels as above stated.

According to one feature of my invention, I make use, for the respective currents, supplied to the "primary" strip of frequencies, which are not sub-multiples of one another, as specified in my above mentioned prior U. S. application, but are a little different from one another so as to produce interference beats.

The use of such frequencies permits of obtaining a more advantageous law of variation of the voltages induced in the secondary strips. Furthermore, it permits of making all the primary strips substantially of the same area, whereby the reactance is substantially the same for each of them and the respective induced voltages are of the same order of magnitude.

According to another feature of my invention, in order to permit of independently adjusting, for each frequency, the relative phases of the voltages induced in each of the secondary strips, the primary conductor strips are carried by independent plates or rings, respectively, the position of which with respect to the secondary strips can be adjusted at will.

In my above mentioned prior U. S. application, I made use of as many tubes as there were output channels to supply, so that, if the number of said channels was very great, as is the case in systems of television, it was necessary to have recourse to a great number of tubes.

According to a feature of my invention, I make use of a single valve, including, around a common cathode (capable of supplying a very strong electronic emission) connected with the input channel, a very great number of anodes constituted by the ends of the secondary strips, and disposed in star-like fashion, along generatrices of the cylinder constituting the cathode. Such a tube permits of simultaneously supplying a very great number of output channels.

Still another feature of my invention lies in the provision, for fixing the level above which the voltage maximum in the secondary strips are to permit the passage of the signals, of resistance means in the cathode circuit, thus excluding the use of a fixed voltage battery for this purpose.

According to still another feature of my invention, in devices of the type above described, I make use, instead of a vacuum tube, of a gas discharge tube, i. e. a tube the bulb of which contains an atmosphere of gas at low pressure, or ionizable metal vapor. I make use for instance of a heated cathode, or of a liquid cathode on which a cathode spot is maintained, such arrangements ensuring a very strong electronic emission. The gas present in the tube, which is either helium, or mercury vapor, is kept in an ionized state by means of suitably supplied auxiliary electrodes. Preferably, a grid limits the range of the space that is ionized and fixes the potential in the tube. Above this grid I dispose a very great number of independent anodes. Preferably, a main anode is provided at the end of the bulb where are disposed the independent anodes. This main anode is supplied through an auxiliary direct current distribution, so as to maintain a very high ionization in the whole of the tube. Each anode may, if necessary, be individually placed in a closed space the potential of which is stabilized by a suitably biased grid.

For application to television, I may, by means of such tubes and without having recourse to very high voltages, supply the vertical independent conductors described in my French Patent No. 860,481, filed June 28, 1939, and the first addition to this patent, filed May 7, 1941. This result can be obtained by means of a tube of relatively small dimensions. These vertical conductors can be brought to a relatively high voltage, as high as about one hundred volts, which is sufficient for the application that is considered. I can modify the potential of these vertical conductors in a very short time, despite their capacities, owing to the large currents which are supplied by this new tube.

Other features of my invention especially concerning its application to multiplex telephony will result from the following detailed description of specific embodiments thereof.

Preferred embodiments of my invention will be hereinafter described with reference to the accompanying drawings, given merely by way of example, and in which:

Fig. 5 shows, schematically, an arrangement of a distributor tube of the mercury vapor type, and of its supply circuit;

Fig. 6 is a sectional view of a tube with a heated and heat-insulated cathode, for use in the system of the present invention;

Fig. 7 is a curve of the intensity of the current supplied in the tube of Figure 6 as a function of the potential difference applied, and shows the influence of the positive charges;

Figure 9:
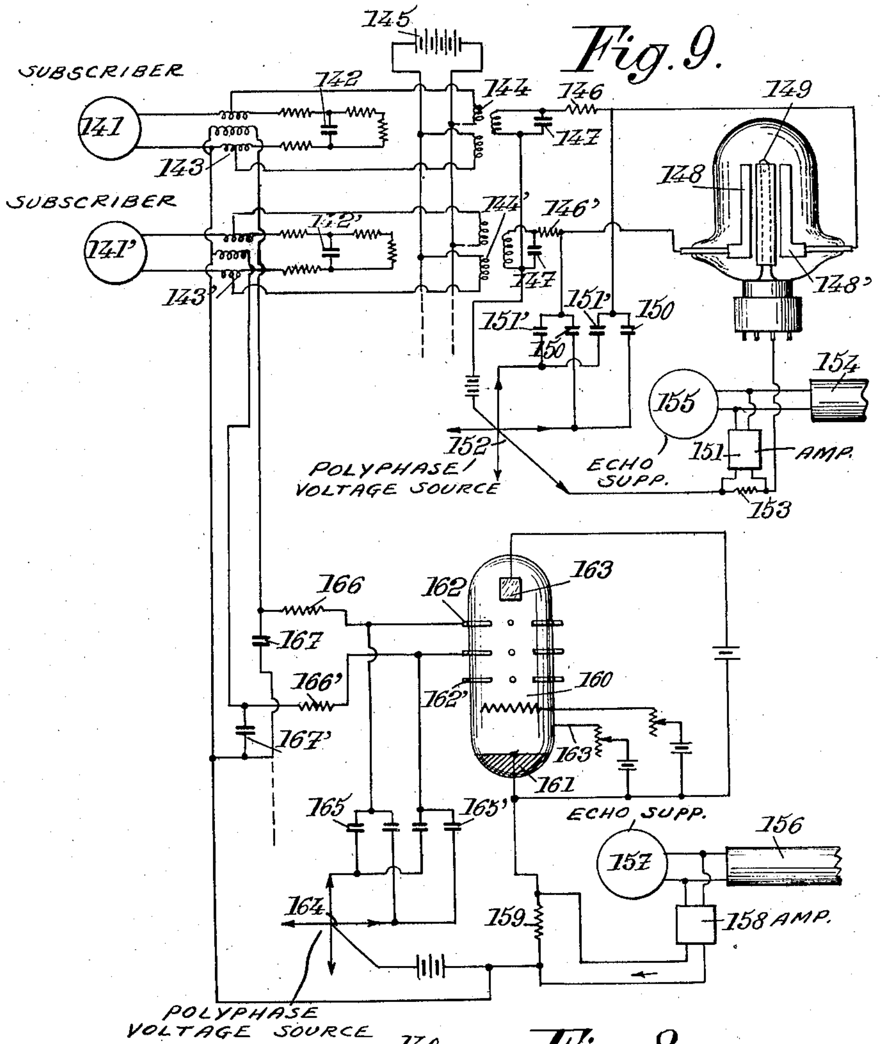
Figure 8A:
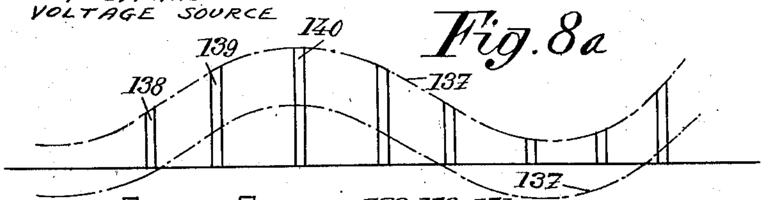
Figure 10:
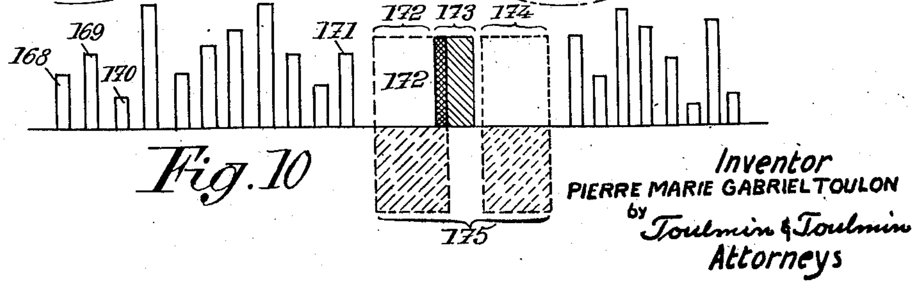

Figs. 8*a* and 8*b* are wave form diagrams of voltages occurring in the practice of the invention;

Fig. 9 is a schematic circuit diagram of a multiplex telephone system utilizing the invention;

Fig. 10 illustrates how synchronizing signals are transmitted on the line.

Figure 1:
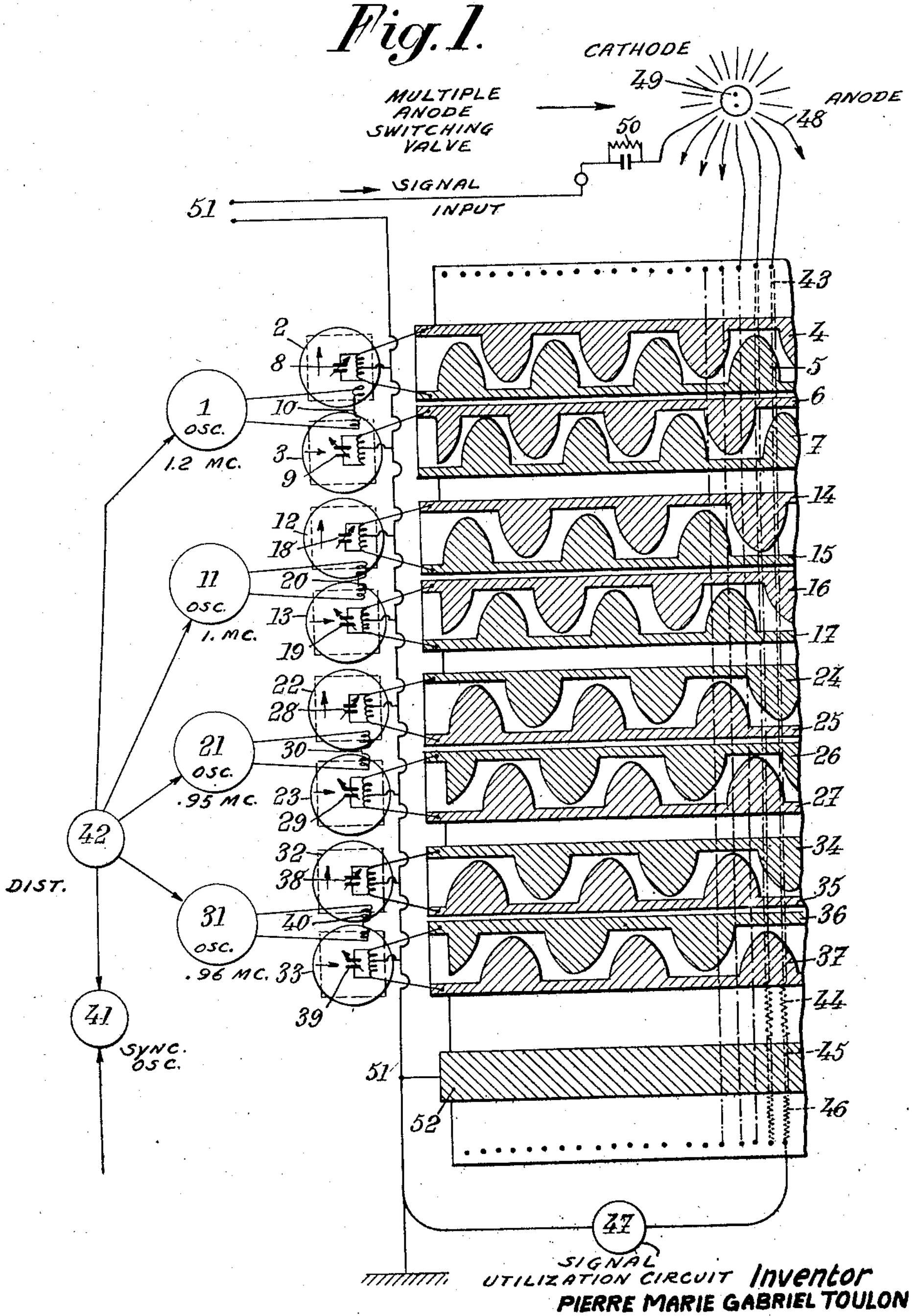
Fig. 1 is a diagrammatic general view of a distributor system for receiving from a single input channel 10,000,000 impulses per second and feeding them to a very great number of output channels (1000)

Fig. 1 shows how it is possible, according to my invention, to distribute among a great number of output channels successive impulses coming in at an extremely high rate. For instance the impulses come at the rate of 10,000,000 per second and the number of output channels to be supplied is 1,000, each of these channels receiving 10,000 impulses per second.

My system includes a plurality of oscillators 1, 11, 21 and 31 working at predetermined frequencies, for instance 1,200,000 periods per second for oscillator 1, 1,000,000 periods per second for oscillator 11, 950,000 periods per second for oscillator 21, 960,000 periods per second for oscillator 31. These oscillators are kept in synchronism with one another by means of an oscillator 41 itself synchronized by means of synchronizing signals and acting through a distributor 42. Each oscillator 1, 11, 21, 31 supplies two oscillatory circuits in which the voltages are in phase relation at 90° to each other. The voltage in circuit 2 is leading by 45° upon that of oscillator 1. This circuit 2 includes an inductance coil and its capacity is constituted by primary conductor strips 4 and 5; a small condenser (padder) 8 permits of adjusting the phase. Likewise, oscillatory circuit 3, which supplies primary strips 6 and 7, is adjusted through padder 9, so that its voltage lags by 45° behind that of oscillator 1. Inductive coils 10 ensure coupling between oscillator 1 and oscillatory circuits 2 and 3. The same arrangement is utilized for the other oscillators. Oscillatory circuit 12 supplies primary strips 14 and 15, and its voltage is adjusted by means of padder 18 to lead by 45° upon that of oscillator 11. Ocsillatory circuit 13 supplies primary strips 16 and 17 and its voltage is adjusted by means of padder 19 to lag by 45° behind that of said oscillator 11. The coupling between oscillator 11 and oscillatory circuits 12 and 13 is ensured by coils 20. Likewise, oscillator 21 excites oscillatory circuits 22 and 23, respectively leading and lagging by 45°, owing to coil 30. These oscillatory circuits supply primary strips 24, 25, 26, 27, respectively and padders 28, 29 ensure the desired adjustment. Finally, oscillator 31 is coupled through coils 40 with oscillatory circuits 32, 33 which supply primary strips 34, 35, 36, 37, respectively, said oscillatory circuits being adjusted by means of padders 38 and 39. Primary strips 4, 5, 6, 7, 14, 15, 16, 17, 24, 25, 26, 27, 34, 35, 36, 37 are provided on the front face of a sheet of an insulating material having small losses at high frequency. On the rear face of said sheet, I provide a great number of equidistant parallel secondary strips 43. Each of these last mentioned strips is connected with one of the anodes 48 of a multiple valve respectively. The cathode 49 of this valve is connected, through a device 50 including a large capacity and a leak resistance, with the channel 51 through which the impulses are supplied. Each strip 43 is further connected with a decoupling resistance 44, a second conductor strip 45, a second resistance 46, and finally with the utilization circuit 47 to be supplied from channel 51.

Strips 45 are disposed opposite a conductor strip 52, connected with one of the terminals of 51, itself earthed. Resistances 44 and 46, and capacitor 45 constitute decoupling means which prevent the high frequency currents from oscillators 1, 11, 21 and 31 from influencing the utilization circuits 47.

Primary strips 4, 5, 6, 7, 14, 15, 16, 17, 24, 25, 26, 27, 34, 35, 36, 37 may have very small areas, wherefore the voltages produced by induction in anode 48 are important because the reactance is very low.

The ogive-shaped conductor deposits which form said primary strips are formed on independent plates or rings adjustable in position with respect to the insulating sheet which carries the conductor deposits which form the secondary strips.

Figure 2:
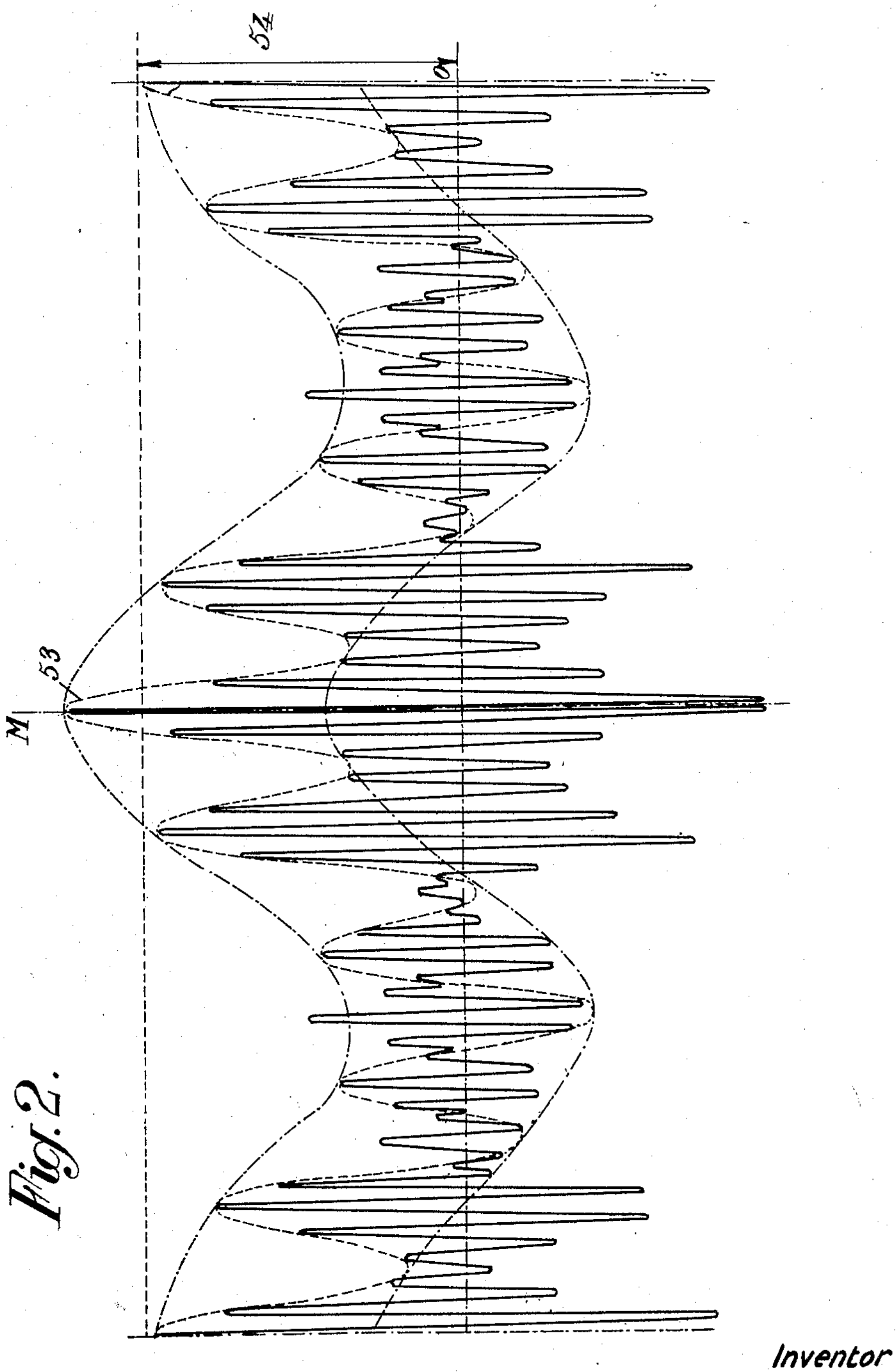
Fig. 2 is a curve of variation, as a function of time, of the voltage induced on any of the conductor strips included in the capacity distributor of Fig. 1.
Figure 3:
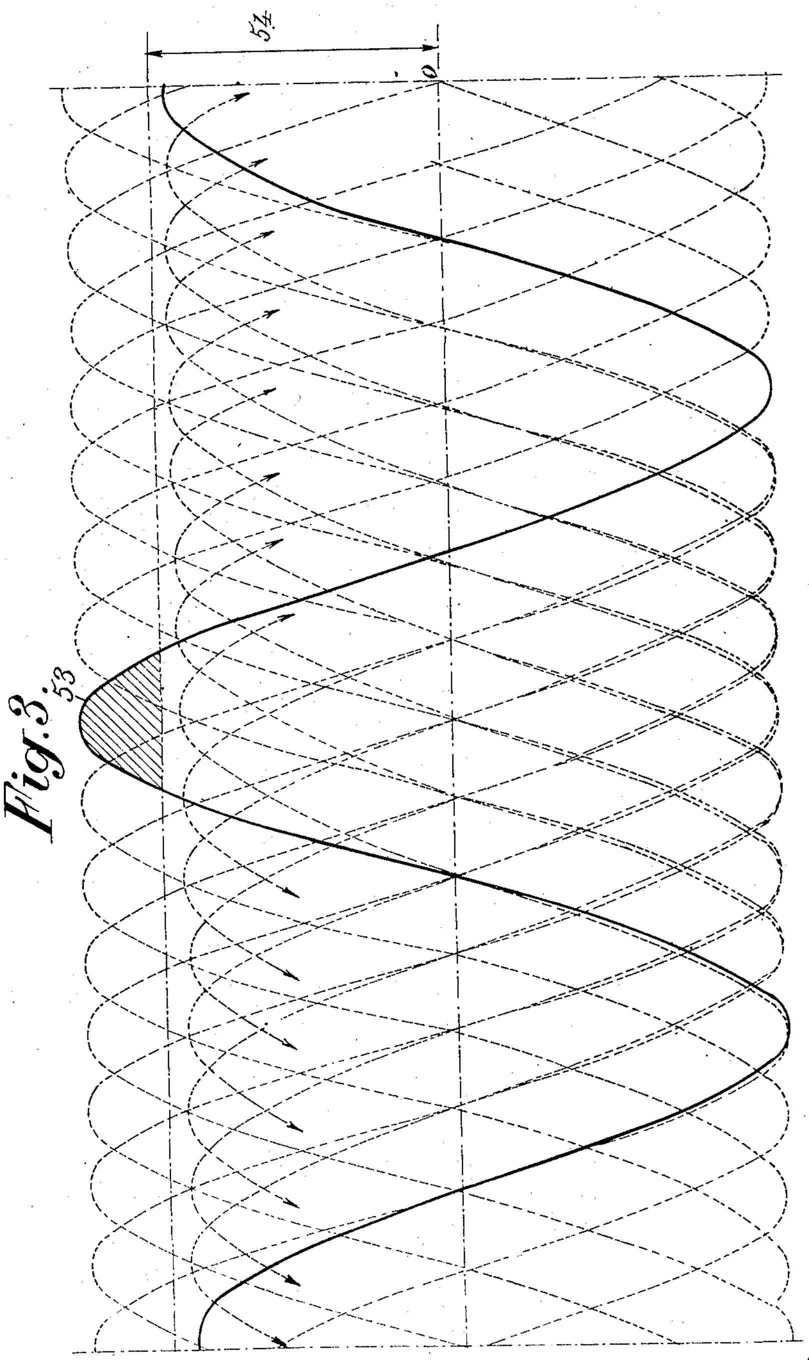
Fig. 3 is an enlargement of the central portion of Fig. 2 and shows an oscillogram corresponding to a higher scanning rate.

Figs. 2 and 3 relate to the picking up of the signals. These figures represent, as a function of time, the amplitude of the alternating voltage induced in any of strips 43. In these figures, the frequency beats 1,200,000−1,000,000=200,000 periods per second; 1,000,000−950,000=50,000 periods per second; 960,000−900,000=60,000 periods per second, are clearly visible. The shape of this curve, which is extremely involved, is particularly well adapted to the picking up of the signals.

In Fig. 3, I have shown, greatly enlarged in the direction of the abscissas, the central portion of the curve of Fig. 2. The voltages induced in each of the successive strips 43 are shown side by side, in dotted lines. Each curve has a very sharp maximum 53 and the successive voltage maximums occur at equal intervals from one another. I have shown at 54 the minimum voltage to be reached by an anode to permit the flow of current. It is clear that the anode which receives voltage 53 can supply current only during a very short time interval (as shown by cross-hatching). The shape of the curve of Fig. 3 is particularly advantageous because the maximums are very sharp; eight impulses can be insulated during a period corresponding to one-half cycle of oscillator 1.

Figure 4:
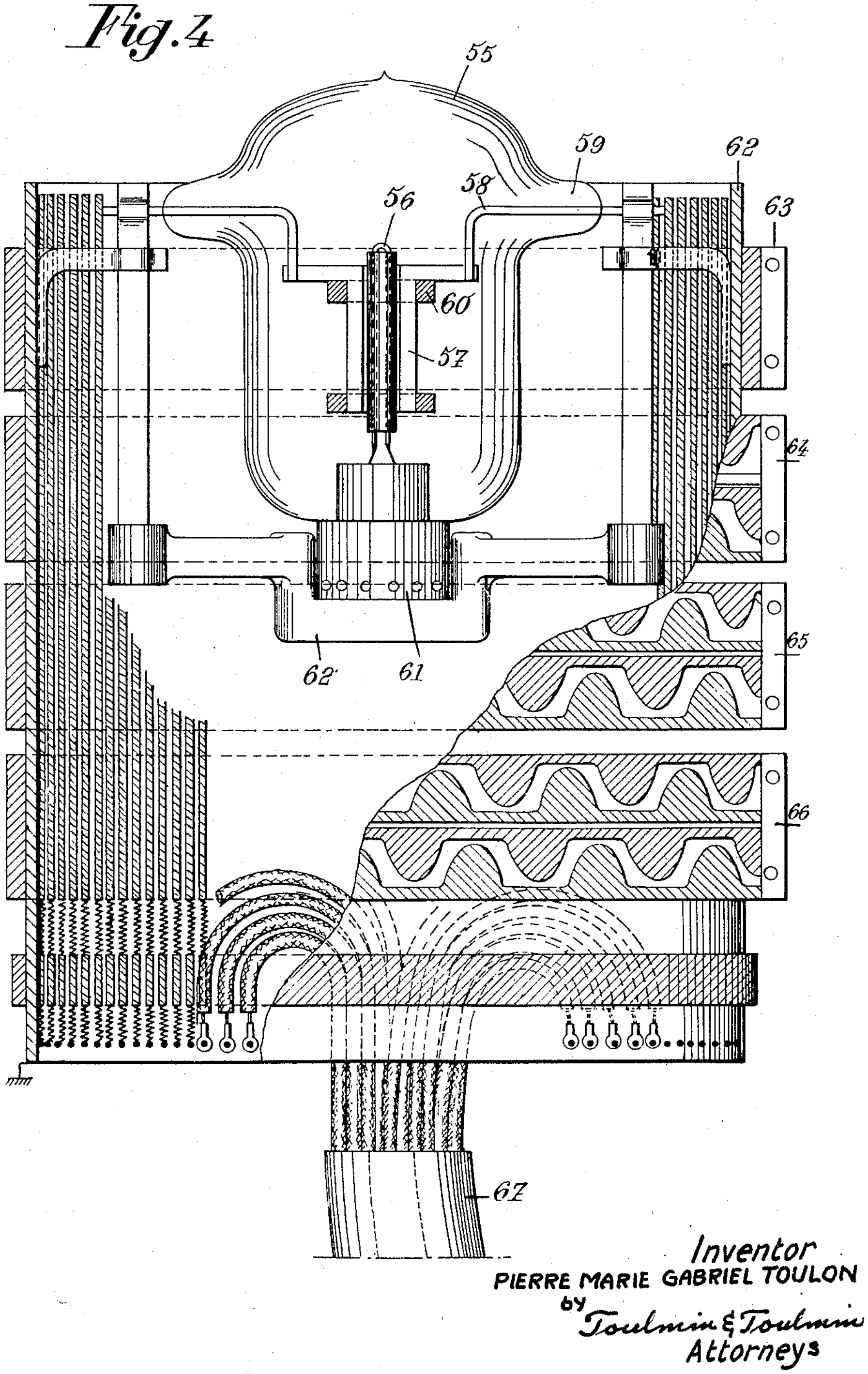
Fig. 4 is a diagrammatical view of the multiple anode valve connected with the distributor.

Fig. 4 shows an example of a practical construction of a device such as is diagrammatically shown in Fig. 1. I make use of a special valve 55 which includes, around a common cathode 56 of the indirectly heated type, supplying a very strong electronic emission, a great number of anodes 57, constituted by nickel strips disposed edgewise in star-like relation about this cathode. Each strip is welded to a conductor wire 58 and all the wires are in turn welded in a glass flaring portion 59, according to the well known construction for tubes of the acorn type. The thin metal strips are held in a steatite support 60, fixed to the foot, and cap 61 is disposed at the center of a cylinder of insulating material 62 in which are disposed the inductor strips above described.

About this cylinder are disposed rings 63, 64, 65, 66 carrying the primary strips shown in Fig. 1. The position of these rings can be adjusted by rotation about the axis of the tube. The different lines fed by the device are shown at 67. Each tube 55 may include about fifty anodes, whereby it suffices to place side by side twenty systems analogous to that shown by Fig. 4 for ensuring the supply of 1000 channels.

Fig. 5 shows a tube containing a great number of individual anodes capable of supplying very high currents, owing to the use of mercury vapor. In a sealed bulb 101, where a suitable vacuum has been provided and from which gases have been suitably removed, I provide a liquid cathode 102 on which a cathode spot is maintained; preferably this spot is stabilized in position through any suitable means, for instance a tungsten rod 103 projecting from the surface of mercury. The spot is kept active by means of an electrode 108 and an auxiliary feed system 107. Above the mercury the bulb 101 is of very great area, and is suitably cooled to ensure condensation of mercury vapor therein, and to prevent it from taking place in a lateral branch conduit 105 which is relatively warmer. I provide a grid 104 in this branch conduit. This branch conduit opens into a tube 109 at the end of which is an anode 106. In this tube are disposed a great number of rods 114 acting as individual anodes, and for instance constituted by tungsten wires embedded and sealed in the tube wall, in a manner which is well known in the art. One suitable method of construction is that known for so-called "Acorn" radio tubes. Owing to the output of anode 106, the whole of tube 109 is filled with ionized plasma. The presence of grid 104 stabilizes the potential of this plasma. On the other hand, tube 109 is suitably kept at a temperature higher than that of bulb 101, so that the condensation of mercury on its walls is practically negligible and the various anodes 114 are suitably insulated from one another. In these conditions, if any of the anodes is brought to a positive potential about ten volts above that of the cathode, current flows through this anode, whereas there is practically a negligible flow of current when it is brought to a negative voltage. The phenomenon is practically independent of the frequency and I have found that a very important current flow (which may be as high as several tens or hundreds of instantaneous amperes) can be obtained for a time of passage not longer than one fifth of a microsecond. On the other hand, the output of the anode may be instantaneously very high. A tube, the cathode of which consumes, for its heating, but very little energy when suitably heat insulated, or the cathode spot of which is kept active by a current of some few amperes, can thus supply extremely high instantaneous currents in any of the anodes. Of course, as the time of passage of the current is extremely short with respect to the time for which no current is flowing, the amount of heat that is given off is extremely small. If an anode 114 has a suitable area, this amount of heat is insufficient for raising the temperature of this anode to an excessive degree. This is a necessary condition, as otherwise rectification might be defective.

In the example shown in the drawing, each of the anodes 114 is connected with a voltage distributor of the capacitor type, i. e. of the type illustrated in Figures 1 and 4. Fig. 5 only shows the supply of two anodes, but it should be well understood that the other anodes, which are fifty or one hundred in number for instance, will be supplied with current in the same manner. As above described, I make use of a polyphase current source 112, preferably including several frequencies in cascade. In Fig. 5, source 112 is a four-phase distribution, and capacitors 113 permit of impressing on anode 114 an alternating voltage of suitable phase. Polyphase source 112 is suitably synchronized by means of impulses from the outside. Anode 114 is further connected through a decoupling element including a resistance 115 and a capacitor 116, with the signal source 113 which derives the impulses to be distributed in a manner not illustrated per se. A bias battery 119 determines the mean potential of electrode 114. The distributed impulses may be utilized at the terminals of resistance 118. With this type of apparatus a certain difficulty is experienced due to the fact that, during the period for which the electrodes are brought to a negative voltage, their output in the reverse direction is not exactly negligible as in the case of high vacuum tubes. It seems that the positive ions present in the plasma supply an appreciable current; this current has the form of a saturation current but fortunately its value remains extremely low.

Fig. 7 is a plot of this current in the reverse direction, as a function of the voltage applied between anode and cathode. The curve of Fig. 7 gives the current as a function of the voltage between electrode 114 and cathode 103. The normal output conditions of the tube correspond to portion 129 of the curve, which shows that the voltage drop in the tube is about 15–18 volts for a current of some amperes. If the current increases very much, the voltage drop in the tube increases but very slightly, as portion 129 of the curve is nearly vertical. When, on the contrary, the voltage across the terminals of the electrodes drops to zero, it is found that there is a very small negative current 126. The anode must be brought to a positive voltage of some volts (about 5 volts), as shown by point 125 of the curve, to have the current reduced to zero. But when the voltage applied to the electrode drops below 5 volts, the current is reversed: it already reaches a very appreciable negative value when the voltage becomes zero (point 126). Then, as the voltage drops more and more, the negative current increases and slightly exceeds the value it had for a voltage equal to zero, but quickly reaches an asymptotic value, remaining practically constant when the voltage drop decreases below −30 volts. I have found that this current is about 100 microamperes. For most rectification applications, this reverse current is negligible. But in the application that is now being considered (that is to say when the ratio of the time period for which no current is to flow to that for which there is a flow of current is very high, as it is the case for instance when the number of anodes 114 is one thousand), this parasitic current is a serious drawback.

According to my invention I provide means for compensating in the signal utilisation circuit (such as 122 in Fig. 5), for this negative saturation current (as shown at 127 in Fig. 7). As this current remains substantially independent of the negative voltage applied by distribution means 112, I provide for this purpose a battery 120 and a potentiometer 121.

Fig. 6 shows a modification of the tube of Fig. 5 in which I make use of an indirectly heated cathode 130. Cathode 130 is constituted by a nickel jacket covered with a layer of barium oxide, surrounding an electrically heated small rod of refractory material. The oxide surface is given a great area, for instance by the provision of radial fins not shown in the drawing. This cathode is placed in a heat insulated chamber 131 containing a number of successive walls. I thus obtain a strong electric emission. At a certain distance from the cathode is provided a distribution grid 132 brought to a positive voltage with respect thereto. Anodes 133 are disposed as in the case of Fig. 5 in successive horizontal layers. They are also passed through the glass by the same manufacturing methods which permit of making acorn tubes. In order to collect the parasitic charges that appear in the tube in the course of its operation, the various anodes are separated from one another by an electrostatic screen connected to the cathode and suitably biased; or alternately, I dispose anodes 133 in spiral-like fashion and provide a suitably biased conductor 134 in the interval between two respective rows of electrodes. This conductor is connected to the upper part of the bulb. The cathode 130 and the anodes 133 are located at the upper part of the tube, and the external surface is suitably arranged to keep a suitable pressure of mercury vapor. I dispose a mercury drop 136 at the lower part; the cooling surface conditions the pressure inside the vessel. I keep the top of the bulb at a suitable temperature in order to avoid condensation of mercury. The tube may also be filled with helium in order to permit operation at still higher frequencies. Electrode 134 may also be brought to a suitable positive voltage in such manner as to extend the ionized plasma beyond grid 132, if necessary. The operation of this tube is identical to that of Fig. 5.

My invention applies to multiplex telephony through a cable, two coaxial cables, or hollow tubes for the use of extremely short waves. For this purpose, the complex current coming from a microphone is chopped into a plurality of extremely short impulses following one another at equal intervals. Fig. 8*a* illustrates the principle of this transformation process (already known and utilized for other purposes). The sinusoidal current 137 to be transmitted (the highest frequency of which will be for instance 3,000 per second) is transformed into extremely short impulses, the frequency of which is considerably higher, for instance 10,000 per second. These successive impulses are given amplitudes 138, 139, 140, etc. corresponding to successive ordinates of the curve 137′ of the musical current to be reproduced (transformed into undulatory current, that is to say wholly above the axis of abscissas). The successive impulses at a very high frequency (10,000 per second) the duration of each of which is extremely short, for instance $$\frac{1}{5\times10^{6}}$$

are transmitted through a single channel. At the receiving station, the initial wave is reconstituted by making use of a filter device which lets pass only the approximate envelope of the individual impulses that have been transmitted. Owing to this chopping or transformation, it is possible to transmit through a single channel a great number of simultaneous communications. The principle of this method, which has already been used, in Baudot telegraphy for instance, or in secret telephony, is well known.

If impulses analogous to those represented by Fig. 8*a* are decomposed into a Fourier series, it is found that the spectrum of frequencies ranges from zero to a very high value.

As the different frequencies travel in the line in very different manners, the incoming signals are very much deformed and an important lag is found to exist, which produces a substantial mixing of these signals. My invention consists in compensating for the influences that may be detrimental of a good transmission by influences of opposite signs. For instance, I compensate a given signal by adding thereto opposite sign or complementary signals. Fig. 8*b* shows by way of indication a compensation method. If 140 is the telephonic modulation to be transmitted, I create a contrary sign modulation 140′. To the above mentioned signals 138, 139, 140 (the envelope of which constitutes the telephonic current curve) I add supplementary signals, such as 138′, 138″—139′, 139″—140′, 140″ occurring at times slightly different from those of the first mentioned signals and which act to compensate for the distortion of said first mentioned signals. The perturbation in the lines is thus greatly reduced.

Fig. 9 illustrates a system for providing telephonic communications, according to my invention, with signals of the type described with reference to Fig. 8*a*. 141 and 141′ are two of the subscribers of a multiplex system to be connected with another multiplex system by means of two coaxial cables, but it is clear that the number of subscribers will be in fact much greater, for instance several hundreds. Each line is balanced by a system 142. I introduce the signals into the line by means of a transformer 143, and I collect them by means of a transformer 144 which permits the supply of the subscriber from central battery 145. The tonal impulses that are received from subscriber 141 and received in transformer 143, permit of supplying, through a decoupling system including resistance 146 and capacitor 147, current to an anode 148. The tube includes a cathode 149, about which are disposed a great number of anodes 148. Each anode is coupled by means of two capacitors 150 and 151′ with an auxiliary polyphase voltage distributor device 152 of the kind above described. The return point of this source is connected through load resistance 153 with cathode 149. All the other anodes, such as 148′, etc. similarly receive voltage from the subscriber sets, such as 141′, through a system analogous to that just above described, the same numerals designating the same parts. Coaxial cable 154 is connected with the charge circuit and I provide, if necessary, in addition to the balancing system 155, an echo suppressor. The level of the signals between resistance 153 and coaxial cable 154 is brought by an amplifier 151 to a value sufficient for ensuring a good transmission. This single amplifier permits of simultaneously ensuring amplification on all the independent channels, and this has a very great practical advantage. As a matter of fact, with a number of subscribers equal to several hundreds, it would otherwise have been necessary to provide a great number of tubes for ensuring the same amplification whereas amplification is ensured in the present case by means of a single amplifier including only a few tubes. The impulses are suitably distributed at the receiving end. An analogous transmission device, provided at the receiving station and not represented on the drawing, permits bilateral connection. The return cable is shown at 156. It is connected with a balancing device or echo suppressor 157. The energy that is collected is amplified at 158 to be applied at 159 to the utilization circuit. The distributing device includes a tube 160, such as that described on Figs. 5 and 6. The system essentially includes a cathode 161 and a plurality of anodes 162, 162′, etc. Auxiliary electrodes 163 permit of maintaining the cathode spot, of keeping the plasma ionized, etc. As already described above, in order to distribute the impulses, I make use of a complex polyphase distributor system 164 which supplies, through capacitors 165, each of the anodes 162 with alternating polyphase current of multiple frequency. The current supplied by circuit 159 and distributed to anodes 162 is transmitted, through suitable decoupling means including resistance 166 and capacitor 167 to transmitter 143. Amplifier 158 permits of raising the level of the signals to a value such that there is no need to perform individual amplification in each of the lines, and as each of the anodes 162 is capable of suppling a very high current, it is thus possible to collect in transformer 144 an energy sufficient for ensuring a good telephonic transmission without having recourse to an individual amplifier in each channel, as in all the multiplex telephony systems known up to this time. I thus ensure a considerable economy in the apparatus of the two multiplex systems.

The complex voltage distributor device 152 at the transmitting end of a line is to be synchronized with the complex voltage distributor device 164 at the receiving end of the same line. In order to ensure this synchronizing, I make use of a fraction of the time which elapses between the passage of two successive impulses on each line. If it is desired for instance to pass 450 simultaneous communications, the system is calculated to be able to pass 500 communications, and in the free intervals I transmit synchronizing signals.

Fig. 10 shows the successive impulses transmitted by the line. 168, 169, 170, etc., are the impulses corresponding to each of the subscribers 141, 141′, etc. After an interval 172, I send a synchronizing train of impulses 173, followed by a period of silence 174. At the receiving end, the distributor device includes, as above stated, a number of anodes 162 greater than the number of channels to be transmitted. I connect together the anodes in excess, i. e. those not used for supplying impulses to the subscribers' lines and I produce, by means of the oscillator 164, signals of a shape complementary with respect to that of the above mentioned signals (including a period of silence 175 between two impulses as shown in dotted lines in Fig. 8). The circuits are arranged in such manner as to detect a current variable in accordance with the respective positions of signals 175 and 173 (for instance corresponding to the portion common to the train of impulses). This portion is shown in cross hatched lines in Fig. 8. It varies considerably when the frequency of oscillator 164 differs, even by a very small amount, from the frequency of oscillator 152. I utilize the detected current corresponding to the cross hatched portion for controlling a device which varies the frequency of the oscillator at the receiving end and adapting it to that of the transmission end. I make use for this purpose of the conventional known methods for ensuring automatic volume control in radio receivers.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principles of the present invention as comprehended within the scope of the accompanying claims.

What I claim is:

1. A system of the type described which comprises, in combination, a set of insulated primary conductor strips, a set of insulated secondary conductor strips extending transversely to the strips of the first set and having only capacitative coupling therewith, means for feeding the respective primary strips with polyphase nonharmonically related alternating currents of respective frequencies little different from one another to produce interference beats, said primary strips being so shaped as to induce via said capacitive coupling in said secondary strips composite voltage variations having sharp maxima in time succession in a predetermined order in the respective secondary strips, means for transmitting to all said secondary strips successive information bearing signals in synchronism with said maxima, and means for collecting said information bearing signals from said secondary strips, respectively, only in response to said voltage maxima.

2. A system of the type described which comprises, in combination, a set of insulated primary conductor strips, a set of insulated secondary conductor strips extending transversely to the strips of the first set and insulated therefrom for capacity coupling therewith, means for feeding each of the respective primary strips with polyphase alternating currents, said primary strips being so shaped as to induce in the secondary strips via said capacity coupling composite voltage variations having sharp positive maxima, respectively, in time succession and in a predetermined order on the respective strips, and an electronic tube including a plurality of anodes connected each with a different one of said secondary strips respectively, and means for applying to said secondary strips an amplitude modulated information bearing signal.

3. A system of the type described which comprises, in combination, a set of insulated primary conductor strips, a set of insulated secondary conductor strips extending transversely to the strips of the first set and insulated therefrom and having capacity coupling therewith, means for feeding the respective primary strips each with polyphase non-harmonically related alternating currents of respective frequencies little different from one another to produce interference beats, said primary strips being so shaped as to induce in the secondary strips composite voltage variations having sharp positive maxima, respectively, in time succession in a predetermined order on the respective strips, an electronic tube including a plurality of anodes each connected with a different one of said secondary strips and a single cathode located in operative relation to said anodes.

4. A system of the type described which comprises, in combination, a set of insulated primary conductor strips, a set of insulated secondary conductor strips extending transversely to the strips of the first set and insulated therefrom to provide capacity coupling therewith, means for feeding polyphase non-harmonically related alternating current to each of the respective primary strips, said primary strips being so shaped as to induce in the secondary strips via said capacity coupling composite voltage variations having sharp positive maxima, respectively, in time succession in a predetermined order on the respective strips, an electronic gas discharge tube including a plurality of anodes connected each with one only of said secondary strips, and a cathode, and means for preventing flow of current from said cathode to said anodes between said maxima.

5. A system of the type described which comprises, in combination, a set of insulated primary conductor strips, a set of insulated secondary conductor strips extending transversely to the strips of the first set and insulated therefrom and having capacity coupling therewith, means for feeding polyphase non-harmonically related alternating current to the respective primary strips, said primary strips being so shaped as to induce in the secondary strips composite voltage variations having sharp positive maxima in time succession in a predetermined order of the voltage maxima on the respective strips, and an electronic gas discharge tube including a plurality of anodes connected with said secondary strips respectively and a cathode cooperative with said anodes to establish electronic current impulses between said cathode and each of said anodes respectively in response to said maxima, and auxiliary electrodes for establishing and maintaining ionized plasma in said tube and for stabilizing the location of said ionized plasma.

6. In a signal distribution system, a gaseous conduction device having a gaseous ionized atmosphere, a plurality of anodes, a single cathode, means normally applying to each of said anodes a bias adequate to maintain anode current cut-off, means for applying successive signals between said cathode and all said anodes simultaneously, and means for reducing the bias of said anodes in succession and in synchronism with said successive signals to enable current flow between said cathode and said anodes in succession in response to said successive signals.

7. In a signal distribution system, a single input channel for successive signals, a plurality of distinct signal output channels, means for distributing successive ones of said first mentioned signals each to a different one of said distinct signal output channels, said last means comprising an ionic tube having a single liquid cathode, means connecting said cathode to said single input channel, said ionic tube further comprising a plurality of anodes, means connecting each of said anodes to a different one of said distinct signal output channels, means for applying bias voltage to said anodes normally substantially to prevent anode current flow between said anodes and said cathode, means for removing said bias voltage from said plurality of anodes in succession, and means for synchronizing operation of said last means with occurrence of said successive signals.

8. In a signal distribution system, a single input channel for successive signals, a plurality of distinct signal output channels, means for distributing successive ones of said first mentioned signals each to a different one of said distinct signal output channels, said last means comprising an electronic tube having a single cathode, means connecting said cathode to said single input channel, said electronic tube further comprising a plurality of anodes, means connecting each of said plurality of anodes to a different one of said distinct signal output channels, means for applying bias voltage to said anodes normally substantially to prevent anode current flow between said anodes and said cathode, means for removing said bias voltage from said plurality of anodes in succession, and means for synchronizing operation of said last means with occurrence of said successive signals.

9. A signal distribution device comprising a gaseous conduction device having a cathode and a plurality of anodes, and means for maintaining continuously between said cathodes and anodes a mass of ionized gas, means normally maintaining a voltage between all said anodes and said cathode for preventing current flow therebetween, means for applying short positive voltage pulses to each of said anodes in succession, and means for applying amplitude modulated voltages to said anodes simultaneously and in superposition to said short positive voltage pulses.

10. A signal distribution system comprising a gaseous conduction device having a container, means comprising a cathode for maintaining continuously within said container an ionized gaseous plasma, a plurality of anodes located within said container, means for generating a plurality of groups of superposed voltages of different phases, means for adjusting the relative amplitudes of said superposed voltages in each of said groups to establish a differently timed maximum voltage for each of said groups, means for applying each of said groups of superposed voltages to a different one of said anodes, and means for applying to all said anodes similtaneously an information bearing signal.

11. A signal distribution system comprising a gaseous conduction device having a container, means comprising a single cathode only for maintaining continuously within said container an ionized gaseous plasma, a plurality of anodes for said gaseous conduction device, a two terminal impedance having one of its terminals connected to said cathode, a pulse generator having a common terminal and a plurality of further terminals, means for connecting said common terminal to the remaining terminal of said two terminal impedance, means for connecting each of said plurality of further terminals to one of said anodes, said pulse generator comprising means for generating relatively time displaced pulses in succession on different ones of said plurality of further terminals, and means for generating in said two terminal impedance a variable information bearing voltage.

12. A signal distribution system, comprising a gaseous conduction device having a container, means comprising a single cathode only for maintaining continuously within said container an ionized gaseous plasma, a plurality of anodes extending into said ionized gaseous plasma, a separate external circuit between each of said anodes and said cathode, a source of successively occurring signals, means for simultaneously applying said successively occurring signals in each of said separate external circuits, said successively occurring signals of variable magnitude insufficient to establish current flow in said external circuits, and means for superimposing on said signals in said separate external circuits in succession voltage pulses of magnitude sufficient to establish current flow in said separate external circuits and through said ionized gaseous plasma.

13. A signal distribution system, comprising a gaseous conduction device having a container, means comprising a cathode for maintaining continuously within said container an ionized gaseous plasma, a plurality of anodes extending within said container, distinct external circuits between each of said anodes and said cathode comprising means for applying to said anodes in succession positive voltage pulses of magnitude sufficient to establish current flow in said external circuits through said ionized gaseous plasma.

14. A signal distribution system, comprising, a gaseous conduction device comprising a first chamber and a second chamber communicating with said first chamber, said first chamber comprising a cathode pool of mercury and an anode, means for energizing said cathode pool of mercury and said anode to establish an ionized plasma in said first chamber and thereby in said second chamber, a plurality of further anodes in said second chamber, a separate circuit from each of said further anodes to said cathode pool, and means for applying to said further anodes in succession positive voltage of magnitude adequate to establish current flow in said separate circuits in succession.

15. A signal distribution system comprising a gaseous conduction device comprising a container containing gas and having a first anode and a cathode, and means for energizing said first anode and cathode to provide continuous ionization of said gas, a plurality of further anodes each in contact with said gas, means normally maintaining substantially zero current between all said further anodes and said cathode, means for applying successively occurring signal voltages between all said anodes and said cathode, and means for applying a further pulse voltage in succession to different ones of said anodes in synchronism with said successively occurring signal voltages, said further pulse voltage of sufficient magnitude to establish current flow between one of said further anodes and said cathode.

16. In combination, a system for distributing signals from a single input channel to a plurality of output channels in succession, comprising, an electronic tube connected between said single input channel and said plurality of output channels, said electronic tube comprising a first electrode connected to said single input channel and a plurality of further electrodes connected each to one of said plurality of output channels, means normally maintaining said electronic tube non-conductive, means for applying a plurality of superposed A.-C. voltages between said first electrode and each of said plurality of further electrodes, said A.-C. voltages only slightly different from one another in frequency and non-harmonically related, and the voltages applied between said first electrode and any one of said plurality of further electrodes having a sharp maximum resultant timed differently than the maximum resultant applied to any other one of said plurality of further electrodes, said maximum resultants having values sufficient to transfer current between one of said further electrodes and said first electrode, and means for superposing on said A.-C. voltages a further information bearing voltage.

17. In a system for distributing signals from a single input channel to a plurality of output channels in succession, a gaseous conduction device comprising a plurality of anodes and a cathode, means for connecting a different one of said anodes to each of said output channels, means for connecting said cathode to said single input channel, means for applying equal positive voltage pulses in succession to different ones of said anodes, and means for superposing on all said anodes simultaneously an amplitude modulated information bearing signal.

18. The combination in accordance with the immediately preceding claim wherein is further provided means for maintaining said gaseous conduction device continuously ionized.

19. In a system for distributing signals from a single input channel to a plurality of output channels in succession, a gaseous conduction device comprising a plurality of first electrodes and a second electrode, a mass of gas between said electrodes, means connecting a different one of said first electrodes to each one of said output channels, means connecting said second electrode to said single input channel, means for applying positive voltage pulses to different ones of said first electrodes in succession, said positive voltage pulses equal in magnitude and sufficient in magnitude to cause current transfer through said mass of gas, and means for impressing on all said anodes simultaneously an amplitude modulated information bearing signal.

20. The combination in accordance with the next preceding claim wherein is provided means for continuously maintaining said mass of gas ionized.

21. In combination, a gaseous conduction device having a container, means comprising a cathode and anode for maintaining continuously within said container an ionized gaseous plasma, at least one additional anode extending within said container, means normally maintaining a voltage between said at least one additional anode and said cathode for preventing current flow therebetween, an external circuit extending between said at least one additional anode and said cathode, means for applying to said at least one additional anode a positive voltage pulse of magnitude sufficient to establish current flow in said external circuit through said gaseous ionized plasma, and means for applying to said at least one additional anode a signal voltage in time coincidence with said positive voltage pulse.

22. The combination in accordance with claim 21 wherein said cathode is a cathode pool of mercury.

23. The combination in accordance with claim 21 wherein said cathode is a thermo-emissive cathode.

PIERRE MARIE GABRIEL TOULON.

REFERENCES CITED

The following references are of record in the file of this patent:

UNITED STATES PATENTS

| Number | Name | Date |
|---|---|---|
| 1,289,823 | Langmuir | Dec. 31, 1918 |
| 1,932,606 | Schramm | Oct. 31, 1933 |
| 2,036,350 | Montani | Apr. 7, 1936 |
| 2,086,918 | Luch | July 13, 1937 |
| 2,089,639 | Bedford | Aug. 10, 1937 |
| 2,195,098 | Skellett | Mar. 26, 1940 |
| 2,204,375 | Morrison | June 11, 1940 |
| 2,263,369 | Skillman | Nov. 18, 1941 |
| 2,265,216 | Wolf | Dec. 9, 1941 |
| 2,277,192 | Wilson | Mar. 24, 1942 |
| 2,412,974 | Deloraine | Dec. 24, 1946 |
| 2,418,116 | Grieg | Apr. 1, 1947 |

FOREIGN PATENTS

| Number | Country | Date |
|---|---|---|
| 523,263 | Great Britain | July 10, 1940 |